United States Patent
Kim

(10) Patent No.: US 6,895,069 B2
(45) Date of Patent: May 17, 2005

(54) APPARATUS FOR COUNTING ROTATION FREQUENCY OF NUMERAL WHEEL OF METER FOR REMOTE METER READING SYSTEM

(75) Inventor: Joo Young Kim, Gyeonggi-do (KR)

(73) Assignee: Chois T&M Corp. (KR)

( * ) Notice: Subject to any disclaimer, the term of this patent is extended or adjusted under 35 U.S.C. 154(b) by 0 days.

(21) Appl. No.: 10/772,545

(22) Filed: Feb. 5, 2004

(65) Prior Publication Data

US 2004/0240602 A1 Dec. 2, 2004

(30) Foreign Application Priority Data

May 30, 2003 (KR) ................................ 20-2003-0016986

(51) Int. Cl.[7] .............................................. G06M 3/00
(52) U.S. Cl. ........................ 377/3; 377/16; 324/76.11; 73/488; 73/504.02; 250/231.13; 250/231.17
(58) Field of Search ........................ 324/76.11; 73/488, 73/504.01, 504.02, 504.03, 504.07; 377/3, 16; 250/231.13, 231.15, 231.17

(56) References Cited

U.S. PATENT DOCUMENTS 5,640,013 A * 6/1997 Ishikawa et al. ......... 250/338.4
6,271,523 B1 * 8/2001 Weaver et al. ........... 250/341.8

FOREIGN PATENT DOCUMENTS

| KR | 2000-0066245 | 11/2000 |
|----|--------------|---------|
| KR | 10-0287540 | 1/2001 |
| KR | 20-0273026 | 4/2002 |

* cited by examiner

Primary Examiner—Margaret R. Wambach
(74) Attorney, Agent, or Firm—Ostrolenk, Faber, Gerb & Soffen, LLP

(57) ABSTRACT

Disclosed is an apparatus for counting the rotation frequency of a numeral wheel of a meter to be used for a remote metering system. A light reflection tape is coated on one of low placed numeral wheels. A light sensor unit has an opaque case formed with first and second holes in which an infrared ray emitter and an infrared ray sensor are located, respectively. The light sensor unit is fixedly mounted on the ceiling of a rectangular shaped housing which is detachably coupled with a meter to cover the front of the meter. A portion of the housing over numeral wheels and a front plate of the meter is transparent. The transparent portion of the housing has an infrared ray rejection function to prevent infrared rays from entering into the housing. In place of employing such housing, a light shield may be used to shield a space between the light sensor unit and the light reflection tape coated numeral wheel from outer light. A microprocessor counts the rotation frequency of the light reflection tape coated numeral wheel by counting the number of output pulses from the infrared ray sensor to measure an amount of a supply, for example, gas used, A power supply portion using batteries supplies the light sensor unit and the microprocessor with necessary power. Particularly, for the minimum consumption of the battery power, an input signal for the infrared ray emitter is made in a pulse form signal of which duty ratio is under 1/100.

22 Claims, 10 Drawing Sheets

APPARATUS FOR COUNTING ROTATION FREQUENCY OF NUMERAL WHEEL OF METER FOR REMOTE METER READING SYSTEM

BACKGROUND OF THE INVENTION

1. Field of the Invention

The present invention relates to a remote meter reading system for a meter, and more particularly, to an apparatus for counting the rotation frequency of a numeral wheel of a meter which counts the rotation times of the numeral wheel of a predetermined digit in existing meters by a light sensing method, so that the used amount of a supply such as gas can be monitored from a remote place.

2. Description of the Prior Art

The amount of usage of supplies, such as electricity, gas, or water, is metered when the supplies pass through a meter. The amount of usage is expressed by a number value of a numeral wheel counter disposed on the front side of a meter. The charge for supply usage is determined with respect to the amount of usage. A manual meter reading method, by which in order to read a meter for the amount of the supply used, a meter-reading person visits each consumer's house and reads a meter, needs a lot of time and efforts and also causes much inconvenience.

In order to solve the problems of this manual meter reading method, a system enabling remote automatic meter reading of a meter is strongly demanded. Among remote automatic meter reading systems of a meter there is a digital meter. This is a meter formed for a digital method, not for a mechanical method, and outputs the amount of the supply used as a digital electric signal such that a remote automatic meter reading system can be easily built. However, since this needs to replace existing mechanical type meters, the expense is high, and the economic efficiency is low. Accordingly, it is difficult to practically apply this to ordinary household use. Alternatively, there is a meter which embeds a magnetic type lead switch or a hole sensor in a mechanical meter and produces electric pulses as a means to count the rotation frequency of a numeral wheel of a meter. However, the meter also has the problem that an existing mechanical meter cannot be used as is, and it is highly probable that a metering error by a magnet occurs. Due to these problems, a light sensing type apparatus for counting the rotation frequency of a numeral wheel of a meter is greatly attracting attention because it can utilize an existing meter while minimizing the effect to the performance of a meter or safety.

As prior art related to an apparatus for counting the rotation frequency of a numeral wheel of a meter using a light sensing method, there are Korean Patent Registration No. 10-0287540 entitled "Apparatus for generating signal of usage amount of meter by light sensing", Korean Patent Application Laid-open No. 2000-0066245 entitled "Apparatus for counting rotation frequency of numeral wheel of meter", and Korean Utility Model Registration No. 20-0273026 entitled "Apparatus for counting rotation frequency of numeral wheel of meter". In constructing an apparatus for counting the rotation frequency of a numeral wheel of a meter in a light sensing method, forming a light sensor by means of an infrared ray emitter and an infrared ray sensor is the most practical and competitive way, considering requirements such as economic efficiency, stability of operations, the life span, and low power consumption.

FIGS. 1a and 1b show the structure of an apparatus disclosed in the Korean Utility Model Registration No. 20-0273026. According to this apparatus, a reflection sheet 20 is attached to the outer surface of a predetermined numeral wheel 11a of a meter 5. In addition, an optical sensor unit 22 is formed with a light emitter 22a emitting light to the numeral wheel 11a and an optical sensor 22b detecting the light reflected by the reflection sheet and outputting the detected light as an electric signal. This optical sensor unit 22 is mounted on the inner surface of a housing 21 and then this housing 21 is detachably coupled with the cover 12 on the front of the meter 5 by covering the cover 12. The optical sensor unit 22 is formed by means of an infrared ray emitter 22a and an infrared ray sensor 22b. The optical sensor unit 22 and the reflection sheet 20 are installed only over the lowest digit numeral wheel. A part of the housing 21 on which the optical sensor unit 22 is mounted should be made to be opaque or translucent, while a part of the housing facing the numeral wheel counter formed with the remaining numeral wheels and a metal plat on the front of the meter, on which meter product information (the proper number of the meter, class, maximum usage amount per hour, maximum use pressure, an authentication institute, authentication number, etc.) is written, should be transparent. This is to enable a consumer or a meter reading person to read with the naked eye, to confirm that the amount of use measured by remote automatic meter reading matches the amount of use measured by manual meter reading, and also to confirm meter product information such as the proper number of the meter, the class of the meter, maximum allowable quantity of use per hour.

To the infrared ray emitter 22a, driving pulses as shown in FIG. 2a are provided as power such that infrared ray emission is intermittently repeated during the time when the driving pulses are provided. If the consumer uses a supply, for example, gas, the predetermined numeral wheel 11a to which the reflection sheet 20 is attached begins to rotate. If the reflection sheet 20 rotating together with the predetermined numeral wheel 11a comes just below the optical sensor unit 22 of the meter 5, an infrared ray emitted from the infrared ray emitter 22a is reflected by the reflection sheet 20 to the light sensor 22b. If the remaining section of the numeral wheel 11a on which the reflection sheet 20 is not attached comes below the light sensor 22, the reflection as such hardly occurs. As the predetermined numeral wheel 11a rotates, the section on which the reflection sheet 20 is attached and the remaining section on which the reflection sheet 20 is not attached pass alternately below the light sensor 22. As a result, a sensing signal obtained from the light sensor 22b has a shape in which there are pulses in a predetermined section, that is, in a reflection section, while there are no pulses in a predetermined section after a predetermined point, that is, in a non-reflection section, as shown in FIG. 2b. A means capable of counting pulses is connected to the output terminal of the light sensor 22b and by counting the frequency of repetition of the reflection section and non-reflection section, calculates the rotation frequency of the predetermined numeral wheel 11a.

However, a meter may be installed outdoors or indoors and there is natural light or artificial light where the meter is installed. Generally, this external light includes an infrared ray having a wavelength that can be detected by the light sensor 22b. If the housing 21 is constructed as described above, though external light would not be incident directly on the light sensor 22b, external light penetrates into the transparent part on the front side of the housing 21c and is incident indirectly on the light sensor 22b, through complex multiple reflections between the numeral wheel counter, an inner surface of the housing 21c and the front surface part of the meter on which meter product information is written, and along the narrow space of the numeral wheels 11b on which the optical sensor unit 22 is not disposed, as shown in FIG. 1b. In other words, external light is incident on the numeral wheels 11b on which the optical sensor unit 22 is not disposed (particularly on the numeral wheels neighboring the numeral wheel 11a on which the optical sensor unit 22 is disposed), and diffusedly reflected by the numeral wheels. Part of the reflected light is incident on the numeral wheel 11a and is reflected by it to be mixed with the infrared ray emitted by the infrared ray emitter 22b, and is ultimately incident on the light sensor 22b, too. Particularly, since the front surface part of the meter on which meter product information is written is usually made of a metal plate with a very high reflection rate, for example, an aluminum plate 14, a considerable portion of external natural light or artificial light, which is incident on this part at a low angle, is strongly introduced into to the light sensor part. When this external light is introduced and mixed, the level of the output sensing signal from the light sensor 22b is raised both in the reflection section and the non-reflection section and the amplitude difference between the two sections is relatively reduced such that discrimination between the reflection section and the non-reflection section becomes difficult, as shown in FIG. 2c. Particularly, when the meter 5 is installed outdoors and exposed to sunlight, the strength of an external infrared ray which is mixed with the infrared ray originated from the light sensor 22b becomes very high. In this case, it is very difficult to distinguish the reflection section from the non-reflection section, which may result in a great deal of error in automatic meter reading.

As an alternative method to reduce this error, it can be considered to further raise the amplitude of a driving pulse of the light emitter 22a with taking the maximum level of an expected noise signal into consideration. However, this method increases power consumption and reduces a replacement cycle for battery which is used as a power source. Accordingly, it is difficult to employ this method. In addition, since there is a limit to the increase of the amplitude of the driving pulse of the light emitter 22a due to the intrinsic characteristic of the device, the amplitude increase should be limited under a predetermined value, which makes it difficult to solve the problem.

Meanwhile, in addition to the apparatus for counting the rotation frequency of a numeral wheel of a meter as described above, the entire optical remote meter reading system further comprises a pulse generator 30 which provides a driving pulse signal ($P_{in}$) to the light emitter 22a; an amplifier 32 which amplifies the output signal of the light sensor 22b; a micom 34 which by recognizing changes of 'non-reflection→reflection→non-reflection' through comparison of levels of the output pulses ($P_{out}$) from the light emitter 22b, counts the rotation frequency of the numeral wheel 11a; a transmitter 36 which wirelessly transmits usage amount data counted by the micom 34 together with consumer information; and a battery 38 which provides needed power to these elements.

Using commercial electric power source instead of a battery is not appropriate because the commercial electric power cannot be used as is due to a lot of noise. In addition, it imposes an additional burden on consumers and additional cabling works for power supply are needed. Accordingly, it is practically difficult to employ the method. There may be a compulsory examination for the effective period of a meter in each country. In Republic of Korea's case, the examination period for effective period of a meter is 5 years. The life span of a battery needs to be longer than this period.

Accordingly, a remote meter reading system needs to be designed as an optimized energy saving type one which can minimize power consumption in operation. However, the prior art technologies described above only mention that a pulse signal is used as a driving signal, but fail to suggest a specific solution required for the energy saving design.

SUMMARY OF THE INVENTION

To solve the above problems, it is an object of the present invention to provide an apparatus for counting the rotation frequency of a numeral wheel of a meter which even when installed in a place where there is a huge amount of infrared ray, can prevent occurrence of measuring error due to the external infrared ray.

It is another object of the present invention to provide an apparatus for counting the rotation frequency of a numeral wheel of a meter which makes a battery replacement cycle longer than an examination cycle for an effective period of a meter through minimizing power consumption in order to remove inefficiency and inconvenience of replacement of a battery before expiration of an examination period for an effective period of a meter.

According to an aspect of the present invention, there is provided an apparatus for counting the rotation frequency of a numeral wheel of a meter for a remote meter reading system, which is applied to a meter in which the numeral value of a numeral wheel counter formed with a plurality of numeral wheels accumulatively increases in proportion to the usage amount of a supply, the apparatus comprising: a light reflection means which is attached on part of the outer surface of any one numeral wheel of the numeral wheel counter so that a surface of the light reflection means having a high reflection rate is directed to the outside, and which reflects an incident infrared ray while rotating with the numeral wheel; a light sensor unit in which two independent holes are formed on one side of a case made of an opaque material, and an infrared ray emitter, which receives a driving pulse signal and intermittently emits an infrared ray, is disposed inside a first hole and an infrared ray sensor, which outputs an electric signal in proportion to the light amount of an infrared ray flowing into a second hole, is disposed inside the second hole; a light sensor fixing housing which has a structure in which the housing is detachably coupled with the meter while the light sensor unit is mounted and fixed inside the housing, and in an assembled state of the housing, the first hole and the second holes are located above a rotation path of the numeral wheel, on which the light reflection means is attached, and at least a part of the housing, covering the numeral wheel counter and a part on which meter product information is written, is transparent so as to be read from the outside, and has an infrared ray blocking function to block external infrared rays flowing into the inside; a micom which calculates the usage amount of the supply by counting the output electric signal from the infrared ray sensor to recognize the rotation frequency of the numeral wheel; and a power supply means which supplies power needed for the light sensor unit and the micom by using a battery power source, and in particular, provides the infrared ray emitter with the driving pulse signal. Since the light sensor fixing housing prevents an infrared ray in the wavelength for operation of the light sensor unit from flowing into its inside, metering error of the amount of supply usage that may occur by optical noise does not occur.

According to another aspect of the present invention, there is provided an apparatus for counting the rotation frequency of a numeral wheel of a meter for a remote meter reading system, which is applied to a meter in which the number value of a numeral wheel counter formed with a plurality of numeral wheels accumulatively increases in proportion to the usage amount of a supply, the apparatus comprising: a light reflection means which is attached on part of the outer surface of a predetermined numeral wheel of the numeral wheel counter so that a surface of the light reflection means having a high reflection rate is directed to the outside, and which reflects an incident infrared ray while rotating with the numeral wheel; a light sensor unit in which two independent holes are formed on one side of a case made of an opaque material, and an infrared ray emitter, which receives a driving pulse signal and intermittently emits an infrared ray, is disposed inside a first hole and an infrared ray sensor, which outputs an electric signal in proportion to the light amount of an infrared ray flowing into a second hole, is disposed inside the second hole, and the light sensor unit is inserted into an aperture formed on a part on the top side surface or the bottom side surface of a meter cover, said part corresponding to the location of the numeral wheel, on which the light reflection means is attached; a light blocking cover which prevents external light from entering into a space between the light sensor unit and the numeral wheel on which the light reflection means is attached; a micom which calculates the usage amount of the supply by counting the output electric signal from the infrared ray sensor to recognize the rotation frequency of the numeral wheel; and a power supply means which supplies power needed for the light sensor unit and the micom by using a battery power source, and in particular, provides the infrared ray emitter with the driving pulse signal. Also, in this case, the space between the light sensor unit and the numeral wheel on which the light reflection means is attached is surrounded by the light blocking cover and external light cannot flow into the space such that metering error of the amount of supply usage that may occur by optical noise does not occur.

In order to more clearly remove possibility of occurrence of metering error due to external optical noise, it is preferable that a light filter means which allows only infrared rays in a wavelength output by the light emitter to pass through is further disposed at the entrance of the second hole, in which the infrared ray sensor is disposed. In addition, it is preferable that an infrared ray absorption material is coated or an infrared ray film is attached on at least the remaining section, on which the light reflection unit is not attached, of the numeral wheel, on which the light reflection means is attached.

Also, in order to provide an infrared ray prevention function to this apparatus, it is preferable that by using molding materials obtained by mixing a transparent plastic resin with infrared ray blocking powder, the housing is made by injection molding. As another method, the housing is made of a transparent plastic resin and on the outer surface or inner surface of the housing, an infrared ray blocking material is coated, or an infrared ray film is attached. As still another method, one of two polarization films whose polarization directions are perpendicular to each other, is attached on the surface of the transparent part of the housing (or the cover of the meter) and the other is attached on the entrance of the second hole, in which the infrared ray sensor is disposed. If these methods are used, it can effectively prevent light noise causing metering error from inputting into the infrared ray sensor.

Meanwhile, according to the feature of the present to achieve the second object, it is preferable that the duty ratio of the driving pulse signal is 1/100 or less. In addition, it is preferable that the cycle of the driving pulse signal does not exceed 250 ms, the duration time is longer than the response time of the infrared ray sensor, and the duty ratio of the driving pulse signal is determined as a value not exceeding 1/100.

BRIEF DESCRIPTION OF THE DRAWINGS

FIG. 2c shows a waveform of an output signal of the light sensing device when external noise light flows in;

FIG. 7a is a perspective view of an installed state of the apparatus and FIG. 7b is a sectional view of the apparatus shown along cutting line C–C'.

DETAILED DESCRIPTION OF PREFERRED EMBODIMENTS

First, a numeral wheel counter 110 of an existing mechanical-type meter to which the apparatus according to the present invention is applied will now be explained briefly. A numeral wheel counter of a meter indicating the amount of supply usage is formed by closely arranging a plurality of numeral wheels to show roughly 4~5 integer digits and 1~3 decimal digits. Each numeral wheel has a drum shape and numbers from 0 to 9 expressed on the outer surface of it. If a supply such as gas, water, or electricity is used, the lowest numeral wheel of the numeral wheel counter 110 in the meter rotates at the fastest speed in proportion to the amount of the supply usage, and the ratio of the rotation speed of a first numeral wheel to that of a second numeral wheel which is one-digit higher than the first numeral wheel is 10 to 1.

Figure 3A:
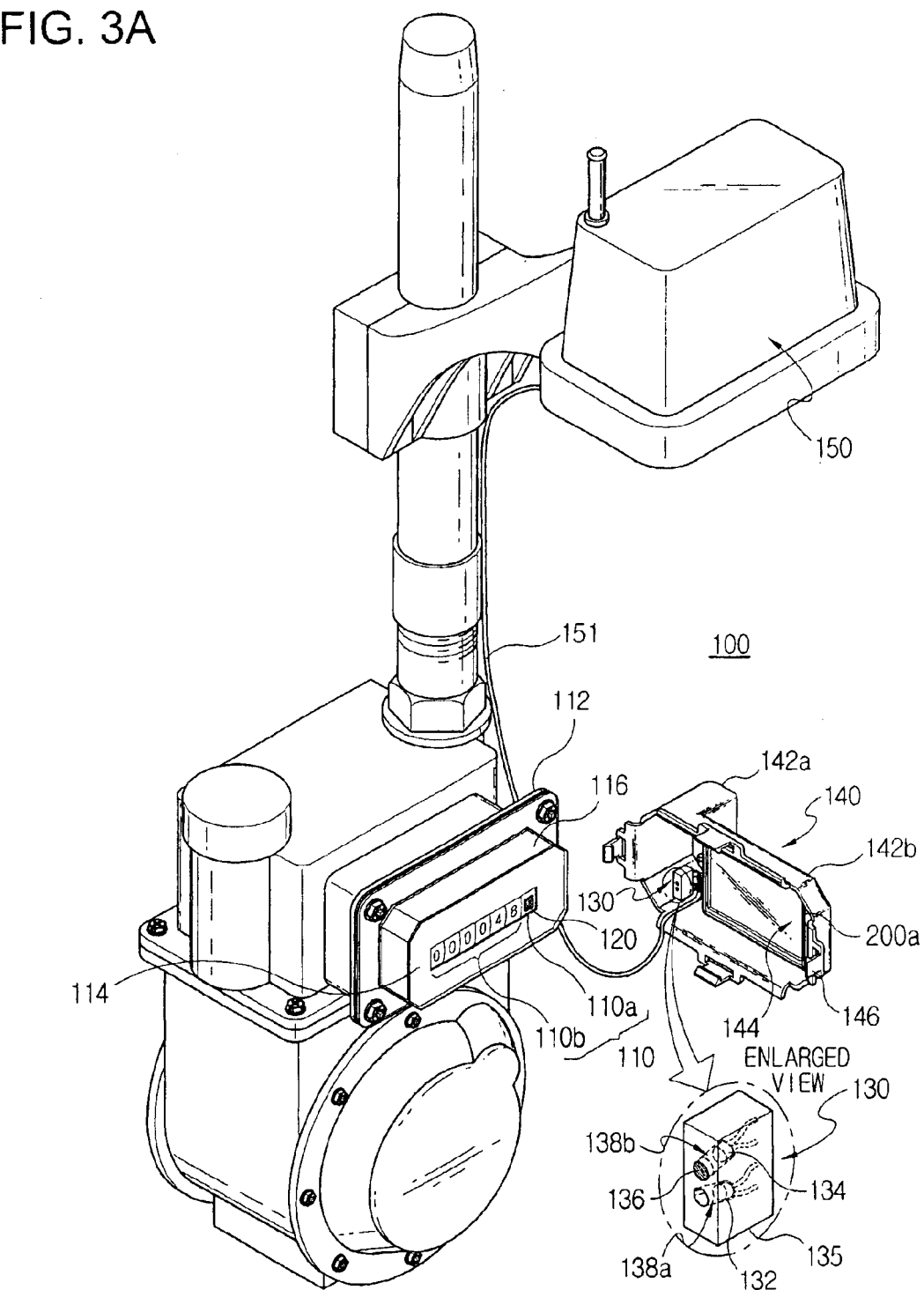
FIGS. 3a and 3b show the structure of an apparatus for counting the rotation frequency of a numeral wheel of a meter according to a preferred embodiment of the present invention before assembling a housing and a light sensor unit to the meter and after the assembling, respectively.
Figure 3B:
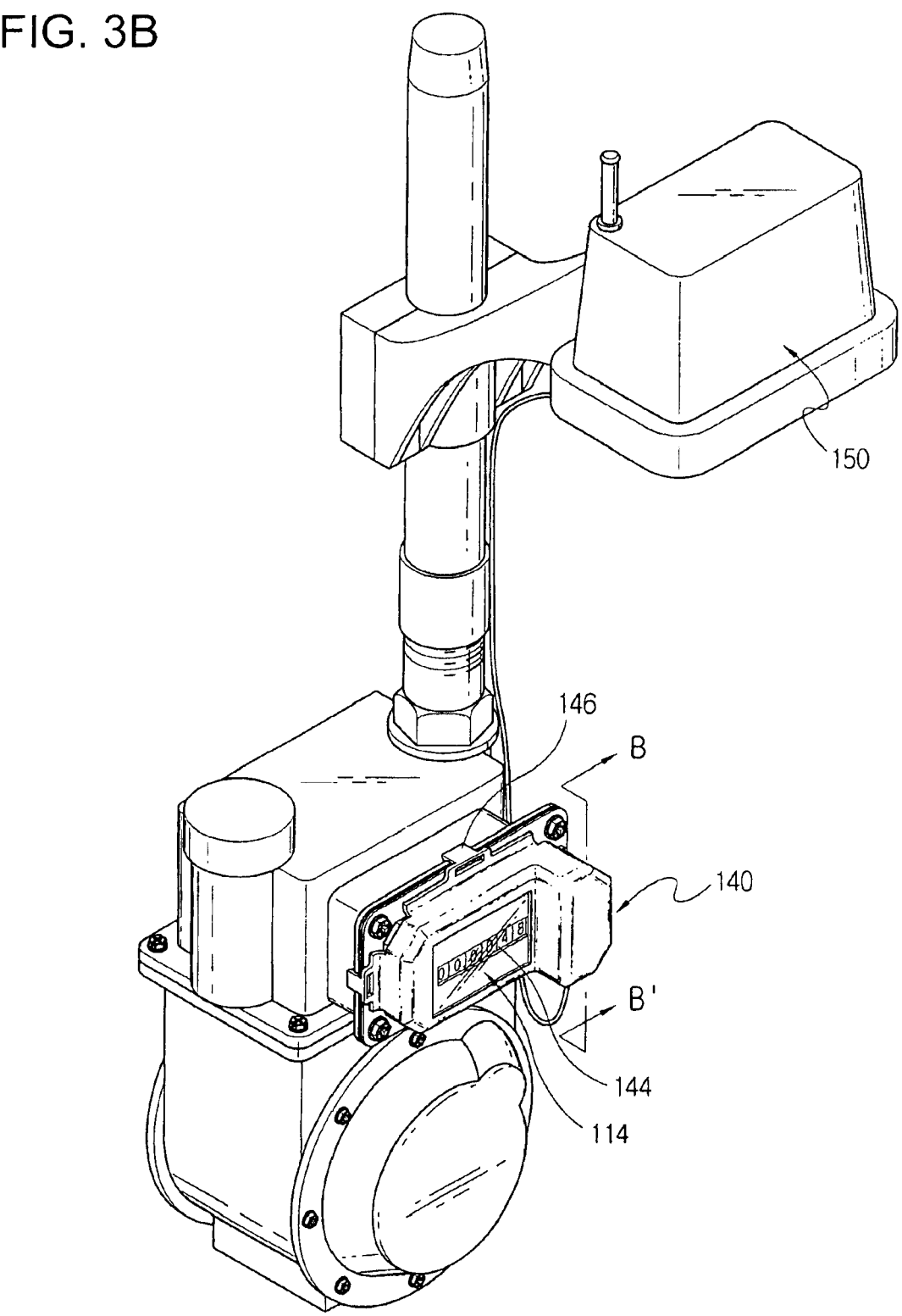
Figure 4:
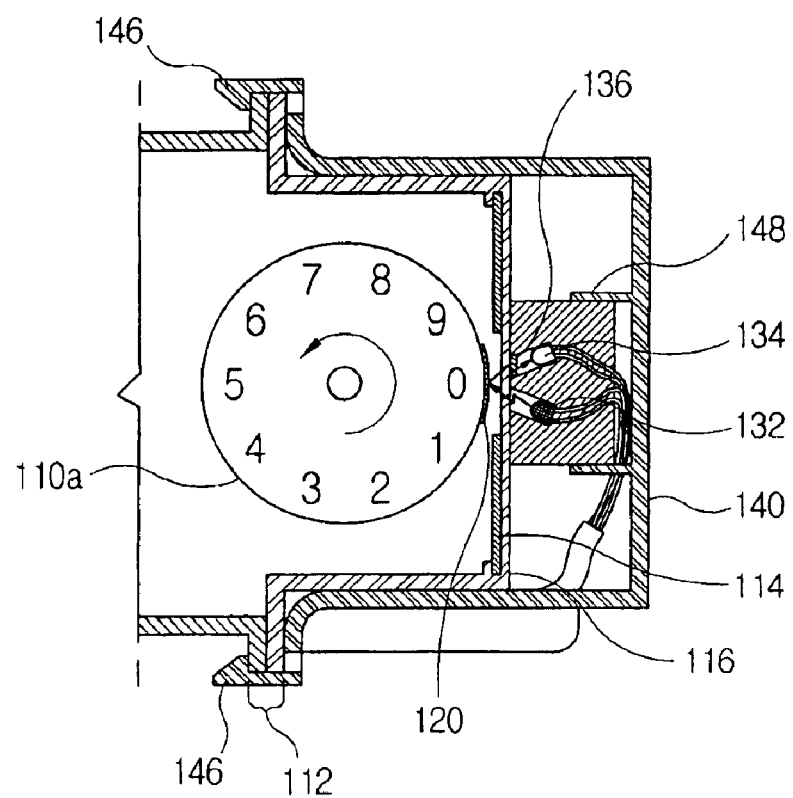
FIG. 4 is a sectional view of the apparatus shown along cutting line B–B' of FIG. 3b.
Figure 6:
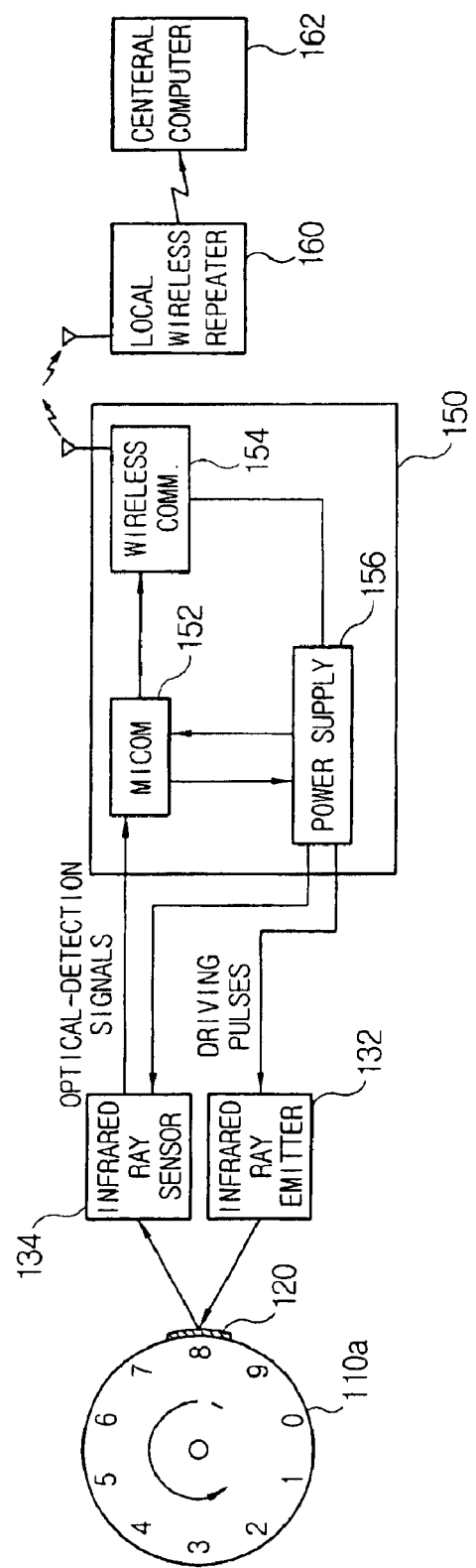
FIG. 6 is a conceptual diagram of the constitution of a wireless remote meter reading system in a unit area (a local area) for remote automatic meter reading.

FIGS. 3a and 3b are diagrams of the structure of an apparatus for counting the rotation frequency of a numeral wheel of a meter according to a preferred embodiment of the present invention, and FIG. 4 is a cross-sectional view of the apparatus shown along cutting line B–B' of FIG. 3b. In addition, FIG. 6 is a conceptual diagram of the structure of a wireless remote automatic meter reading system for remote meter reading in a unit area (a local area). In order to construct a remote automatic meter reading system, an apparatus for counting the rotation frequency of a numeral wheel is installed in each consumer's meter. The apparatus 100 for counting the rotation frequency of the present invention comprises a light reflection sheet 120, a light sensor unit 130, a light sensor fixing housing 140, a micom 152, and a power supply portion 156 including a battery, as means to count the usage amount of a supply, for example, gas. There are a variety of methods for collecting counted usage amount information to a computer system of a supply providing company. In order to wirelessly transmit the information, the apparatus 100 for counting the rotation frequency of a numeral wheel should further comprise a wireless communication portion 154. It is preferred that the apparatus 100 further comprises a wireless repeater 160 in each unit area. Also in the structure, the wireless repeaters in respective unit areas should be connected to a central computer 162 of the supply providing company through a wireless and/or wire communication network. Preferably, the micom 152, the wireless communication portion 154, and the power supply portion 156 are mounted together on a printed circuit board (not shown) to form a single wireless communications unit 150. The light sensor unit 130 and the wireless communications unit 150 are connected through a cable 151.

The light reflection sheet 120 is attached on a part of the outer surface of a low digit numeral wheel, preferably, the lowest digit numeral wheel. Though one number digit is inevitably covered by the light reflection sheet 120, it is not desirable that two or more digits are covered. Accordingly, it is preferred that the length of the light reflection sheet 120 is made to not exceed approximately a $15/100$ of the circumference of the numeral wheel 100a. One rotation of the numeral wheel 110a, on which the light reflection sheet 120 is attached, corresponds with that a section of the outer surface of the numeral wheel 110a on which the light reflection sheet 120 is attached (hereinafter referred to as a 'reflection section') and a section on which the light reflection sheet 120 is not attached (hereinafter referred to as a 'non-reflection section') pass through below the light sensor unit 130 once. Clear distinction and recognition of the reflection section and the non-reflection section directly relates to the accuracy of counting the rotation frequency. Accordingly, in order to clearly distinguish the reflection section from the non-reflection section, it is preferable that the light reflection sheet 120 is made of a material having a high light reflection rate and the non-reflection section, by contrast, is made to well absorb infrared light to prevent reflection. In order to provide an infrared ray absorption function to the non-reflection section, an infrared ray absorbing material may be applied to the outer surface of the numeral wheel 110a, or an infrared ray absorbing film may be attached by pressure bonding and then the light reflection sheet 120 is attached on that. When the light reflection sheet 120 is detached, it will interrupt the rotation of the numeral wheel 110a. Accordingly, it should be solidly attached and, for example, it is preferable that an aluminum thin film tape is attached on the outer surface of the numeral wheel 110a by thermo-compression bonding. It will be more economical if the light reflection sheet 120 is attached when an examination of a newly produced meter or an examination for an effective period expiration of a meter is performed.

The light sensor unit 130 comprises an infrared ray emitter 132 and an infrared ray sensor 134. The light sensor unit 130 is constructed so that light from the infrared ray emitter 132 is incident on the infrared ray sensor 134 not directly, but by reflection. For this, by using an opaque material a case 135 is made such that two independent holes 138a and 138b are formed on one side of the case 135 and the infrared ray emitter 132 and the infrared ray sensor 134 are installed inside the first hole 138a and the second hole 138b, respectively. In order for the infrared ray of the infrared ray emitter 132 reflected by the light reflection sheet 120 to be incident on the infrared ray sensor 134 to the maximum, it is preferable that the first hole 138a and the second hole 138b are formed to be slanted so that the light reflection sheet 120 becomes a vertex as shown in FIG. 4. To reduce transmission loss of an infrared ray, the inside walls of the first hole 138a and the second hole 138b are coated preferably by light reflection films (not shown).

In actually constructing the light sensor unit 130, for example, an infrared ray emitting diode may be used as the infrared ray emitter 132, and a photodiode or phototransistor may be used as the infrared ray sensor 134. It is preferred that the infrared ray emitter 132 outputting near infrared rays in the wavelength range of 700 nm~1100 nm and the infrared ray sensor 134 receiving these rays are used. In particular, it is more preferred that the infrared ray emitter and infrared ray sensor having substantially identical peak wavelengths and spectrum bandwidths need to be used.

The housing 140 having an infrared ray blocking function to be described later can prevent a considerable portion of near infrared rays (approximately over 80%) but allows the wavelength in the visible light range to pass through. Particularly in sunlight, including ultraviolet ray, visible light, and infrared ray, the wavelength distribution is high and rays other than the near infrared ray wavelength band, including a little portion of the near infrared ray wavelength band, may flow inside the housing 140, and through complicated reflection processes, some of the rays may be incident on the infrared ray sensor 134 in the second hole 138b. In this case it is highly probable that the rays may cause light interference with an infrared ray emitted from the infrared ray emitter 132 such that sensing error occurs in the sensor 134. In order to solve this sensing error problem caused by light interference, it is preferable that a near infrared ray filter 136 which selectively allows infrared rays in wavelength bands that can be sensed by the infrared ray sensor 134, to pass through, and prevents light in the remaining wavelength bands from passing through is disposed at the entrance of the second hole 138b in which the infrared ray sensor 134 is installed.

As shown in FIGS. 3a and 3b, while the light sensor unit 130 is fixed on the inside of the housing 140, the housing is detachably coupled with a flange 112, covering a cover 116 which covers a metal plate 114 on the front side, on which the numeral wheel counter 110 is disposed, and side surfaces of the meter. In the housing 140, a part 142a for fixing the light sensor unit 130 and a part 142b for covering the numeral wheel counter 110 of the meter form a stepped shape, and a plurality of locking members 146 enabling the housing 140 to be detachably coupled with the flange 112 of the meter are formed along the rim of the mouth of the housing 140. A light sensor fixing unit 148 into which the light sensor unit 130 can be inserted and fixed is formed inside the part 142a for fixing the light sensor unit 130.

Figure 1A:
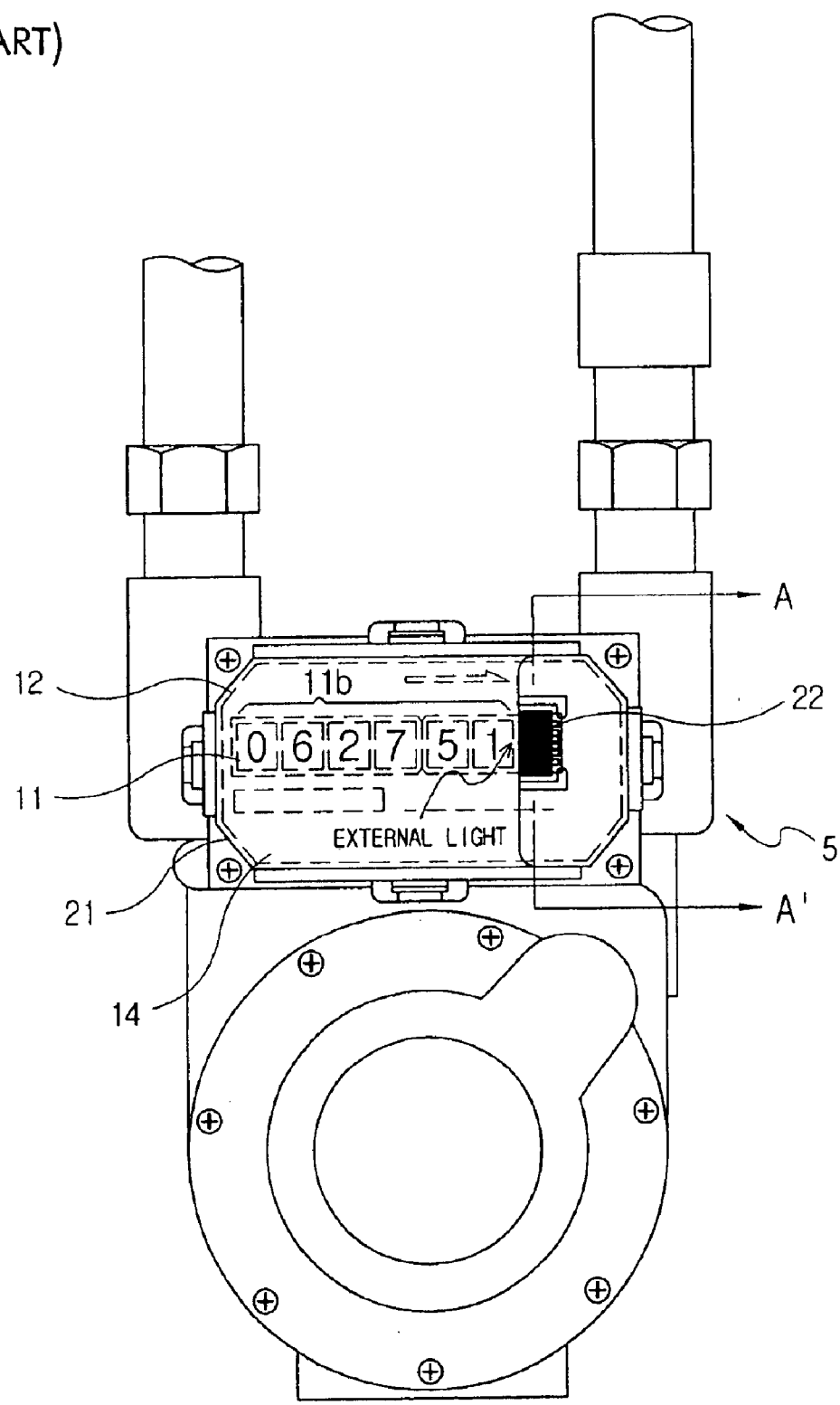
FIG. 1a is a diagram of an installed state of the prior art apparatus for counting the rotation frequency of a numeral wheel of a meter.
Figure 1B:
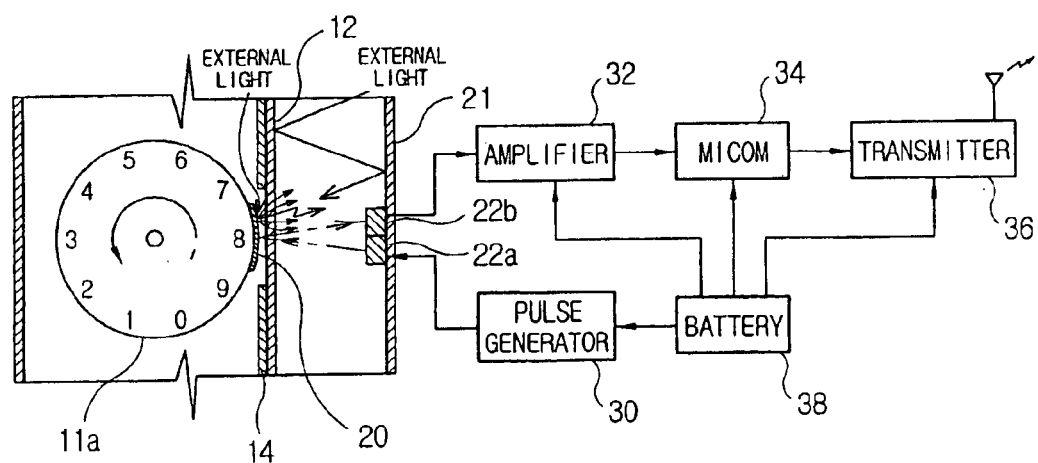
FIG. 1b is a diagram of the structure of the prior art apparatus for counting the rotation frequency of a numeral wheel of a meter, in which a light sensor unit is shown as a sectional view shown along cutting line A–A'.
Figure 2A:
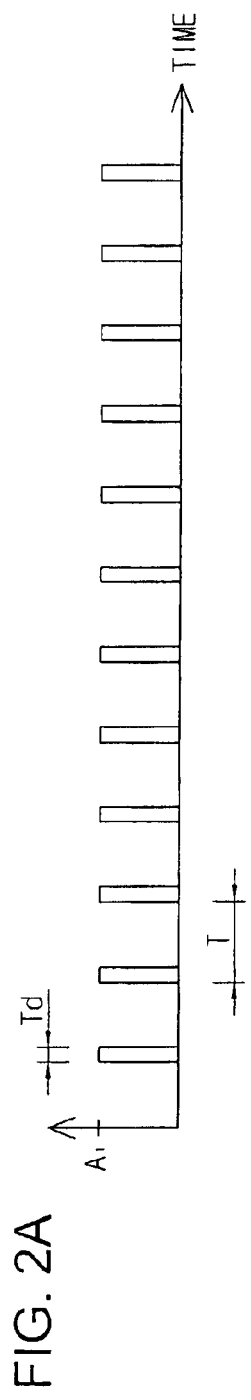
FIG. 2a shows a waveform of driving pulses of a light emitting device.

Since the counted numeral value of the numeral wheel counter 110 should be able to be read even when the housing 140 is mounted on the meter, it is needed to make the housing 140 entirely transparent or at least the part 144 of the housing 140 facing the numeral wheel counter 110 transparent. In the latter case, it is preferable that the parts other than the part 144 facing the numeral wheel counter 110 are made to be opaque so that external light cannot pass through. However, if at least the part 144 facing the numeral wheel counter 110 is transparent, as described above as the problem of the prior art, an infrared ray passes into the housing through this transparent part 144 from the outside so that it works as noise causing a count error. If the noise level is high, it becomes very difficult to distinguish the reflection section and the non-reflection section in the output signal of the infrared ray sensor 134 as shown in FIG. 2c. Accordingly, it is necessary to provide the housing 140 with a function to block influx of external infrared rays that cause errors. Even though the infrared ray blocking function is provided to the housing, the numeral wheel counter 110 and meter product information part on the front surface of the meter should be able to be read by naked eye. Accordingly, visible light should be allowed to pass through the transparent part 144 but near infrared rays that are the wavelength band used by the light sensor unit 130 should be blocked.

In order to provide the housing with an infrared ray blocking function, there are a method attaching an infrared ray blocking film on the housing 140, a method coating an infrared ray blocking material on the housing 140, a method making the housing 140 with a material obtained by mixing an infrared ray blocking material with an injection molding material for the housing 140. Also, there is a method using the principle of polarization. That is, in the method with two polarization films whose polarization directions are perpendicular to each other, that is, 90 degree different, one film is attached to the entire surface of the transparent part 144 of the housing 140, while the other film is disposed at the entrance of the second hole 138b in which the infrared ray sensor 134 is inserted. Except the part 144 covering the numeral wheel counter 110, the housing is made to be opaque. By using this method, inflow of unnecessary light noise into the infrared ray sensor 134 can be blocked.

Figure 5A:
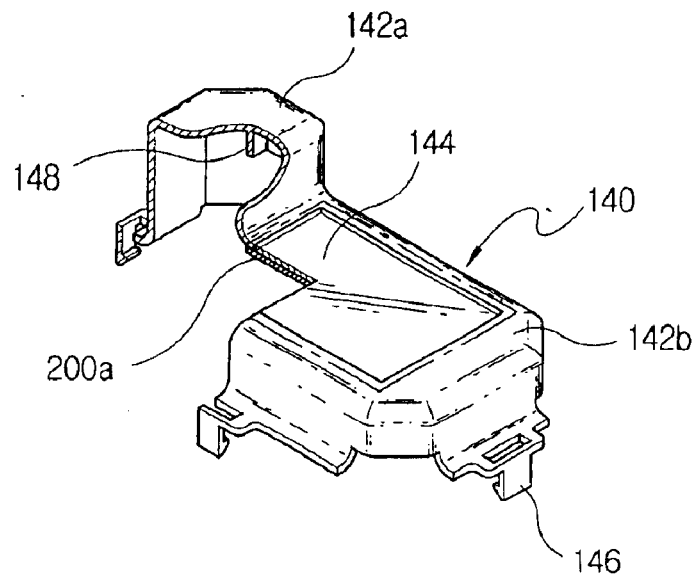
FIGS. 5a and 5b show a housing that a film having an infrared ray blocking function is attached on one side of a transparent window of the housing and a housing that infrared ray blocking material is deposited on one side of the transparent window of the housing, respectively.
Figure 5B:
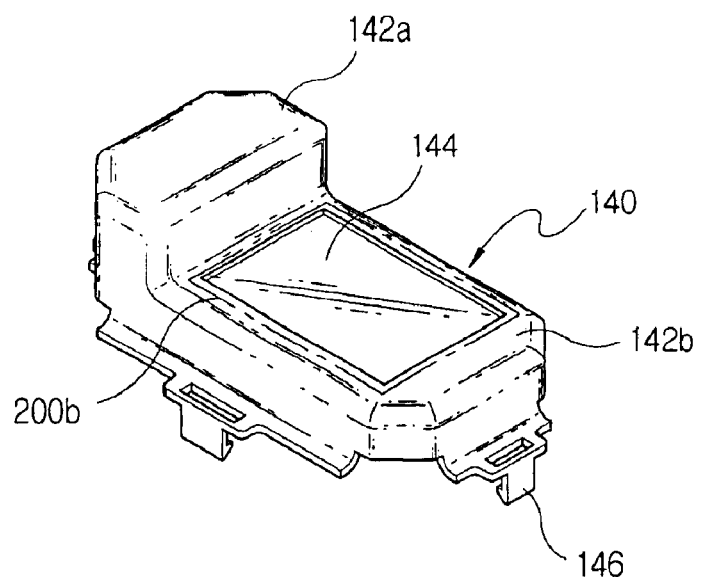

FIG. 5a relates to the first method and shows the case where when only the part facing the numeral wheel counter 110 and meter product information part on the front surface of the meter is made to be a transparent window 144 and the remaining part is made to be opaque in the housing, a film 200a having an infrared ray blocking function is attached on at least one side of the transparent window 144. FIG. 5b relates to the second method and shows the case where infrared ray blocking material 200b is coated on at least one side of the transparent window 144.

There are many commercialized products of an infrared ray blocking material having an infrared ray blocking function, by which visible light is allowed to pass through, while an infrared ray is reflected, or an infrared ray blocking film using the material. There are commercial products with over 80% of an infrared ray blocking rate, and these products may prevent most errors caused by influx of external infrared rays. Only applying theses products to the apparatus of the present invention is needed. Detailed explanations on the products will be omitted.

In the apparatus for counting the rotation frequency of the present invention, the infrared ray emitter 132, the infrared ray sensor 134, the micom 152, and the wireless communication portion 154 are power-consuming elements, and batteries are used as the power source. The source voltage for the wireless communication portion 154 may be the same as those of other elements or may not be. In order to improve the performance of wireless communications, a separate battery for wireless communications may be used in addition to batteries for other elements. It is most preferable that the power source, including that for the wireless communication portion 154, can be formed by means of one AA size battery. That is, when the goal is to construct the power supply portion with one AA size battery so that the power supply portion operates during at least an examination cycle for expiration of an effective period of a meter (5 years in Republic of Korea), special considerations should be needed for power saving. The power consumption of the infrared ray sensor 134 is very small such that it can be neglected. In addition, the micom 152 has no special method for saving power except using sleep mode and wakeup mode that are generally used. Accordingly, there is room for saving power only in the infrared ray emitter 132 and which driving method for this will be employed has a great influence on the amount of power consumption.

A method to reduce power consumption in the infrared ray emitter 132 is providing driving power as in a form of pulse signal with a very low duty ratio. The current capacity of the AA size battery is approximately 2700 mAh. Broadly speaking, half of the entire current capacity is consumed in the micom 152 and the remaining half is consumed in the infrared ray emitter 132. Considering a margin by natural discharge of the battery and the like, it can be assumed that for five years that is an examination cycle for expiration of an effective period of a meter in Republic of Korea, the current capacity allocated to the infrared ray emitter 132 is 1000 mAh. Then, 200 mAh is available for the infrared ray emitter 132 every year, and approximately 0.55 mAh is allowed to be consumed every day. In order to satisfy this requirement, the driving power source of the infrared ray emitter 132 should be a pulse signal as shown in FIG. 2a and in particular, the duty ratio and amplitude of the pulse signal need to be minimized. Only when the current value of the driving signal is at least approximately 2 mA or over, the infrared ray emitter 132 can outputs an amount of light that can be sensed by the infrared ray sensor 134. When the driving signal of the infrared ray emitter 132 is not a pulse signal, at least 48 mAh is consumed everyday. The allowed current capacity is 0.55 mAh. Accordingly, the duty ratio of the driving pulse signal of the infrared ray emitter 132 should be lower than approximately 1/100. In response to the duration time of this pulse signal, the infrared ray emitter 132 emits light intermittently. For stable operation, it is preferable that the amplitude of the driving signal is greater than 2 mA, and in this case, the duty ratio should be reduced in proportion to the amplitude change.

Next, the power supply portion 156 comprises a battery (not shown) and a supply circuit (not shown) providing the battery power to the elements that needs the power, that is, the light sensor unit 130, the micom 152, and the wireless communication portion 154. In particular, since the infrared ray emitter 132 needs the pulse signal, as shown in FIG. 2a, the battery power is converted into a desired pulse signal ($P_{in}$) by using an oscillator and a counter, which generates a pulse signal with a desired cycle (T) and duty ratio (Td/T) which can be obtained by frequency dividing the oscillation signal from the oscillator, and provides the pulse signal ($P_{in}$) to the infrared ray emitter 132. The circuit may be constructed so that the micom 152 adjusts the cycle (T) and duty ratio (Td/T) of the driving pulse signal. Preferably, the cycle (T) of the driving pulse signal ($P_{in}$) is selected appropriately within a range not exceeding 250 ms, and the duration time (Td) is selected as short as possible, but as a value longer than the response time of the infrared ray sensor 134.

Figure 2B:
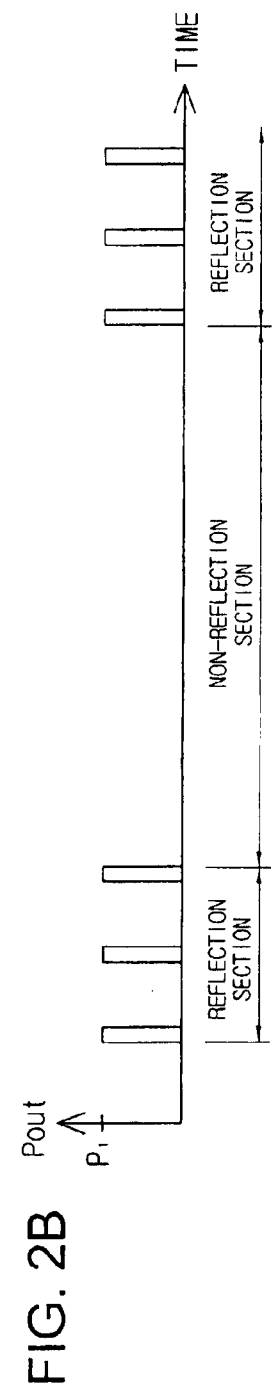
FIG. 2b shows a waveform of an output signal of a light sensing device when there is no noise.
Figure 2C:
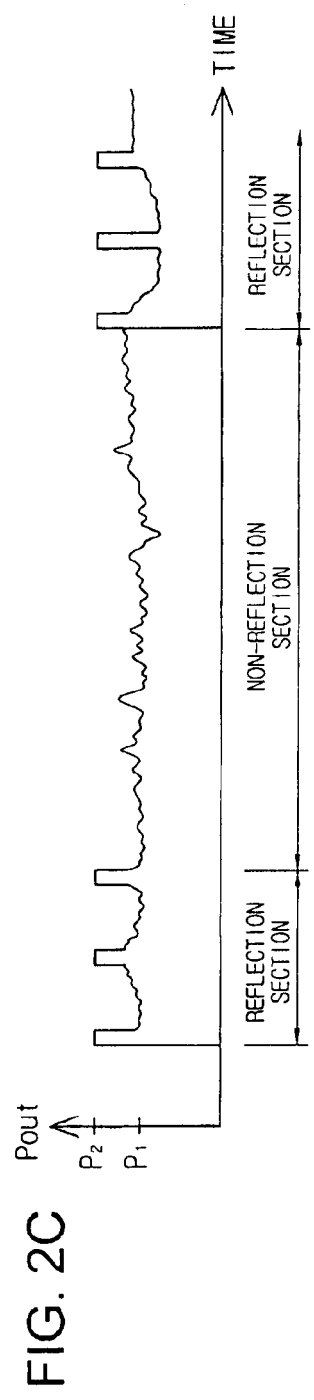

While a consumer uses the supply, when there is no external light noise, optical-detection signals output from the infrared ray sensor 134 may have a waveform as shown in FIG. 2b. The micom 152 receives the output signal of the infrared ray sensor 134, and counts the frequency of repetition of the reflection section and the non-reflection section of the numeral wheel 110a. By doing so, the micom 152 detects the usage amount of the supply, and provides the detected result to the wireless communication portion 154. Of course, instead of the micom 152, a central processing unit (CPU) can be used. The optical-detection signal of the infrared ray sensor 134 may be amplified to a voltage level appropriate to be processed by the micom 152 and then provided to the micom 152. For this, an amplifier (not shown) is disposed between the infrared ray sensor 134 and the micom 152.

The operation principle of the apparatus 100 for counting the rotation frequency of a numeral wheel will now be explained briefly. If a consumer uses the supply, the light reflection sheet 120 attached to a part of the outer surface of a predetermined numeral wheel of the meter begins to rotate. In this rotation process, while the light reflection sheet 120 passes below the light sensor unit 130, an infrared ray emitted from the infrared ray emitter 132 is reflected to the infrared ray sensor 134. Then, with receiving the reflected light as an input signal, the infrared ray sensor 134 outputs a optical-detection signal as shown in FIG. 2b. The output signal of the infrared ray sensor 134 is provided to the micom 152. By sampling the output signal provided by the light sensor unit 130 and comparing with a reference signal, the micom 152 can count the rotation frequency of the numeral wheel. More specifically, for example, when the infrared ray sensor 134 is formed with a phototransistor, an infrared ray incident on the sensor 134 works as a driving source to a base of it and with respect to the received amount of light, the current amount flowing between the collector and the emitter varies. The change in the amount of the flowing current is converted into a voltage of a resistor connected to the emitter and by using this voltage it is determined whether or not an infrared ray is incident. Since the voltage sensed by the phototransistor is an analogue signal having a high level and a low level with respect to the amount of light, the micom 152 performs sampling of the voltage signal and comparison with a reference voltage to convert the voltage signal into digital signals in order to distinguish the reflection section and the non-reflection section. When the output voltage of the phototransistor is 0~1.2[V], it is recognized as a "low (0)" logic level, and when 3.7~5[V], as a "high (1)" logic level. Then, the rotation frequency is counted in a manner that if a digital value, for example, a "high (1)" logic level, continues twice or more and a "low (0)" logic level continues 8 times or more, it is recognized that the reflection section and the non-reflection section of the numeral wheel 110a pass once below the light sensor unit 130, that is, one rotation of the numeral wheel 110a is recognized. The rotation frequency of the numeral wheel counted in this manner in the apparatus for counting of each consumer, that is, the information on the usage amount of the supply, is transmitted to the local wireless repeater 160. Information collected by each local wireless repeater 160 is again transferred to the central computer 162 of the supply providing company through wireless and/or wire communications networks. Thus, the remote meter reading is fully automated.

Meanwhile, the initial value of the numeral wheel counter 110 of a meter is generally not '0000.000' when the meter is installed in a consumer's house. Generally, a newly produced meter may be tested in the factory or when production examination is performed, and after the numeral wheels rotate tens of times for tests, it is installed in a consumer's house. In the case of an already installed meter, it is reused after examination for expiration of an effective period, or after repair examination, and therefore it is highly probable that the numeral wheels may presents a particular initial value larger than '0000.000'. When a meter is installed, the already existing initial value of the numeral wheel counter 110 should be reflected when the usage amount of a supply is counted. As methods to reflect this initial value, there are a method reflecting this value on the central computer 162 of the supply providing company and a method reflecting on the micom 152 mounted on each meter.

In the former method, the initial value of each meter is separately written down by an installer when the meter is installed, and then input to the central computer. In this case, the micom 152 needs to calculate only an accumulated rotation frequency, that is, the accumulated usage amount, and transfer it to the central computer 162. The central computer 162 calculates the usage amount by adding the received accumulate usage amount to the corresponding initial value.

In the latter method, in order to reflect the initial value, when a meter is installed, the initial value of the meter is input to the micom 152 of the apparatus by the installer. In order to reflect the initial value, the value may be input by wire communication or by using a dedicated wireless input device. In this case, the wireless communication portion 154 always transmits the same value with the current value of the numeral wheel counter 110.

In the former method, the numeral value of the micom 152 of the apparatus for counting the rotation frequency of a numeral wheel is not equal to the numeral value of the meter. Accordingly, when the meter is examined on the spot, there is a problem that only after the initial value of the meter stored in the central computer 162 is referred to and then the value is combined with the accumulated usage amount of the micom 152, it can be confirmed whether the apparatus for counting the rotation frequency of a numeral wheel is under normal operation. Also, there is inconvenience that when sensing error occurs, or when the sensing value of the micom is initialized, the initial value of the central computer 162 also should be modified.

Compared to this, the latter method is convenient because there is no need to input the initial value of each meter in the central computer 162, and therefore there is no possibility of occurrence of input errors. Also, if the value of the numeral wheel counter 110 is not equal to the accumulated usage amount value of the micom 152, it indicates an abnormal state, and therefore, whether or not the meter operates normally can be confirmed immediately. Even when the single wireless communications unit 150 is replaced, the initial value of the central computer 162 does not need to be modified.

Any of the two methods may be employed, but when advantages and disadvantages are compared, the latter method is more preferable.

Next, referring to FIGS. 7a and 7b, another preferred embodiment of an apparatus for counting the rotation frequency of meter of the present invention will now be explained. This embodiment is obtained by partially modifying the structure of the light sensor unit 130 of the previous embodiment such that the apparatus does not need the housing 140 and is directly installed on the cover 116 of the meter.

Figure 7A:
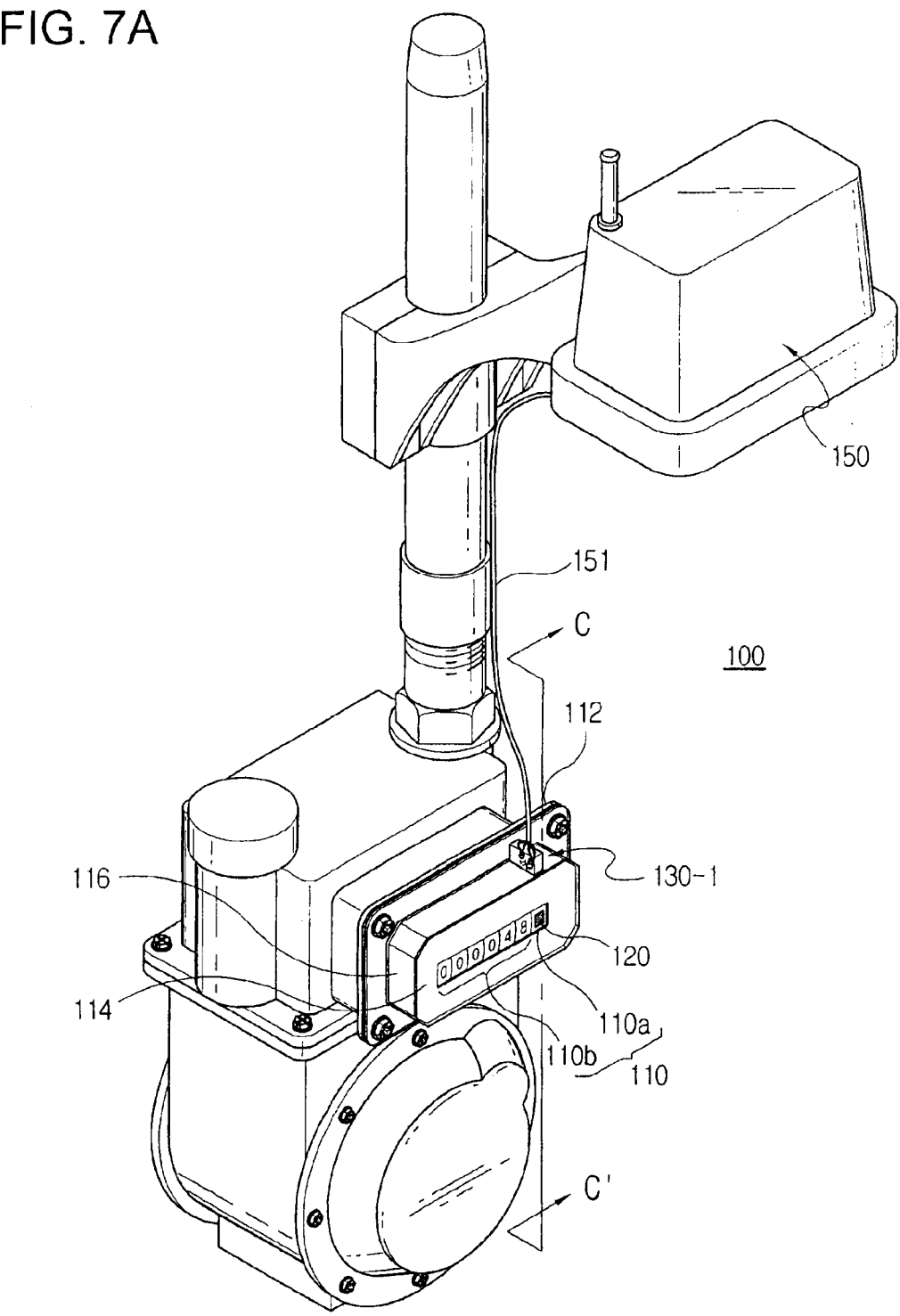
FIGS. 7a and 7b are diagrams of the structure of an apparatus for counting the rotation frequency of numeral wheels of a meter according to another preferred embodiment of the present invention.
Figure 7B:
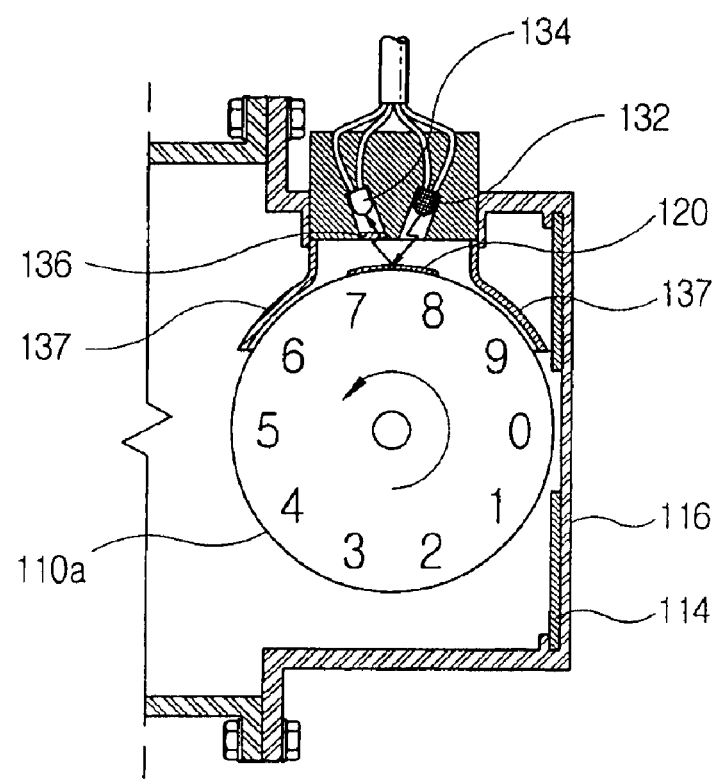

More specifically, as shown in FIG. 7a, on the top side surface or the bottom side surface of the meter cover 116 corresponding to the location on which the lowest numeral wheel 110a is disposed, an aperture into which a light sensor unit 130-1 can be inserted is formed. Into the aperture, the light sensor unit 130-1 is inserted. Of course, in order that dust or water does not inflow from the outside, after the light sensor unit 130-1 is inserted, the aperture is finished with a sealing material.

Since at least the front surface of the meter cover 116 or the entire meter cover 116 is transparent, an additional means which makes light inflowing from the outside not affect the light sensing is needed. In order to minimize the effect of external light, as shown in FIG. 7b, a space between the front surface of the light sensor unit 130-1 and the lowest numeral wheel 110a is surrounded by a light blocking cover so that external light cannot flow into the space.

As a method for this, the light sensor unit 130-1 is constructed to further have a light blocking cover 137 which extends from the rim of the front surface, on which holes 138a and 138b are formed, to a predetermined length in the direction of light emission of the infrared ray emitter 132. In another method, the light blocking cover is not fixed on the light sensor unit 130-1, and instead, the aperture part formed on the bottom side surface or the top side surface of the meter is extended in the form of a tunnel so that part of the numeral wheel 110a is surrounded. In any methods, the light blocking cover 137 needs to cover the front surface of the light sensor unit 130-1 and the side surface of the numeral wheel 110a so that external light is not allowed to enter into the space.

In order to more completely block the entrance of light into the space between the light sensor unit 130-1 and the numeral wheel 110a, it is necessary to provide the infrared ray blocking function to the transparent part of the cover 116 by using the methods applied to the housing 140 in the previous embodiment, that is, by coating an infrared ray blocking material, by attaching an infrared ray blocking film, or by injection molding of the cover after mixing the raw material of the cover with an infrared ray blocking material.

If the light blocking cover with one of those structures is employed, the housing for installing a light sensor unit is not needed.

The prior art optical-type apparatus for counting the rotation frequency cannot be commercialized because when it is installed in a place where natural light or artificial light is strong, metering error due to light noise occurs. However, the present invention uses a housing having an infrared ray blocking function such that it prevents the occurrence of metering error due to light noise in a meter located even in a place where natural light or artificial light is strong. In addition, the present invention complementarily provides an infrared ray absorption function to the remaining section of the numeral wheel 110a except the section, on which the light reflection sheet 120 is attached, or an infrared ray filtering function which, among the lights directed to the infrared ray sensor 134, allows only near infrared rays to pass through. By doing so, metering error due to light noise can be removed almost completely.

Further, the present invention minimizes power consumption so that a battery does not need to be replaced within an examination cycle for expiration of an effective period of a meter. In addition, the apparatus of the present invention can be used for the existing mechanical-type meters without change and when an examination for expiration of an effective period is performed, only the light reflection sheet 120 needs to be attached on the numeral wheel by pressurized bonding. Accordingly, installation of the apparatus of the present invention hardly causes inconvenience to the consumers.

The facts described above mean that the apparatus of the present invention can successfully satisfy commercialization requirements of a remote automatic meter reading system.

Optimum embodiments have been explained above. However, it is apparent that variations and modifications by those skilled in the art can be effected within the spirit and scope of the present invention defined in the appended claims. Therefore, all variations and modifications equivalent to the appended claims are within the scope of the present invention.

What is claimed is:

1. An apparatus for counting the rotation frequency of a numeral wheel of a meter for a remote meter reading system, which is applied to a meter in which the numeral value of a numeral wheel counter formed with a plurality of numeral wheels accumulatively increases in proportion to the usage amount of a supply, the apparatus comprising:

a light reflection means which is attached on part of the outer surface of any one numeral wheel of the numeral wheel counter so that a surface of the light reflection means having a high reflection rate is directed to the outside, and which reflects an incident infrared ray while rotating with the numeral wheel;

a light sensor unit in which two independent holes are formed on one side of a case made of an opaque material, and an infrared ray emitter, which receives a driving pulse signal and intermittently emits an infrared ray, is disposed inside a first hole and an infrared ray sensor, which outputs an electric signal in proportion to the light amount of an infrared ray flowing into a second hole, is disposed inside the second hole;

a light sensor fixing housing which has a structure in which the housing is detachably coupled with the meter while the light sensor unit is mounted and fixed inside the housing, and in an assembled state of the housing, the first hole and the second holes are located above a rotation path of the numeral wheel, on which the light reflection means is attached, and at least a part of the housing, covering the numeral wheel counter and a part on which meter product information is written, is transparent so as to be read from the outside, and has an infrared ray blocking function to block external infrared rays flowing into the inside;

a micom which calculates the usage amount of the supply by counting the output electric signal from the infrared ray sensor to recognize the rotation frequency of the numeral wheel; and a power supply means which supplies power needed for the light sensor unit and the micom by using a battery power source, and in particular, provides the infrared ray emitter with the driving pulse signal.

2. The apparatus of claim 1, wherein the housing is made from a molding material obtained by mixing a transparent plastic resin with infrared ray blocking powder by injection molding so as to have the infrared ray blocking function.

3. The apparatus of claim 2, wherein the housing is made to be opaque except at least the part covering the numeral wheel counter.

4. The apparatus of claim 1, wherein the housing is made from a transparent plastic resin and coated with an infrared ray blocking material or attached with an infrared ray film on the outer surface or inner surface of the housing so as to have the infrared ray blocking function.

5. The apparatus of claim 4, wherein the housing is made to be opaque except at least the part covering the numeral wheel counter.

6. The apparatus of claim 1, wherein the driving pulse signal has a cycle not exceeding 250 ms, a duration time longer than a response time of the infrared ray sensor, and a duty ratio not exceeding 1/100.

7. The apparatus of claim 1, wherein the light sensor unit further comprises a filter unit which allows only infrared rays in a wavelength output by the infrared ray emitter to pass through at the entrance of the second hole, in which the infrared ray sensor is disposed.

8. The apparatus of claim 1, wherein an infrared ray absorption material is coated or an infrared ray film is attached on at least a remaining section, on which the light reflection means is not attached, of the numeral wheel, on which the light reflection means is attached.

9. The apparatus of claim 1, wherein the first hole and the second hole of the light sensor unit are formed to be slanted so that the light reflection means becomes a vertex.

10. The apparatus of claim 1, wherein each of the inside walls of the first and second holes is made to be a light reflection film.

11. The apparatus of claim 1, wherein the duty ratio of the driving pulse signal is 1/100 or less.

12. The apparatus of claim 1, wherein when the meter is installed, an initial value of the meter is reflected in the micom.

13. The apparatus of claim 1, wherein by attaching one of two polarization films whose polarization directions are perpendicular to each other, on the surface of the transparent part of the housing and attaching the other on the entrance of the second hole, in which the infrared ray sensor is disposed, the housing is made to have the infrared ray blocking function.

14. The apparatus of claim 13, wherein the housing is made to be opaque except at least the part covering the numeral wheel counter.

15. Apparatus for counting the rotation frequency of a numeral wheel of a meter for a remote meter reading system, which is applied to a meter in which the number value of a numeral wheel counter formed with a plurality of numeral wheels accumulatively increases in proportion to the usage amount of a supply, the apparatus comprising:
    a light reflection means which is attached on part of the outer surface of a predetermined numeral wheel of the numeral wheel counter so that a surface of the light reflection means having a high reflection rate is directed to the outside, and which reflects an incident infrared ray while rotating with the numeral wheel;
    a light sensor unit in which two independent holes are formed on one side of a case made of an opaque material, and an infrared ray emitter, which receives a driving pulse signal and intermittently emits an infrared ray, is disposed inside a first hole and an infrared ray sensor, which outputs an electric signal in proportion to the light amount of an infrared ray flowing into a second hole, is disposed inside the second hole, and the light sensor unit is inserted into an aperture formed on a part on the top side surface or the bottom side surface of a meter cover, said part corresponding to the location of the numeral wheel, on which the light reflection means is attached;
    a light blocking cover which prevents external light from entering into a space between the light sensor unit and the numeral wheel on which the light reflection means is attached to provide an infrared ray blocking function;
    a micom which calculates the usage amount of the supply by counting the output electric signal from the infrared ray sensor to recognize the rotation frequency of the numeral wheel; and
    a power supply means which supplies power needed for the light sensor unit and the micom by using a battery power source, and in particular, provides the infrared ray emitter with the driving pulse signal;
    wherein the infrared ray blocking function is provided by at least any one of a first method of coating an infrared ray blocking material on the transparent part of a cover of the meter; a second method of attaching an infrared ray blocking film on the transparent part of the cover of the meter; a third method of injection-molding the cover by using a mixture of an infrared ray blocking material and the raw material of the cover; and a fourth method for attaching one of two polarization films whose polarization directions are perpendicular to each other, on a transparent part of the cover of the meter and attaching the other on the entrance of the second hole, in which the infrared ray sensor is disposed.

16. The apparatus of claim 15, wherein when the meter is installed, an initial value of the meter is reflected in the micom.

17. The apparatus of claim 15, wherein the light sensor unit further comprises a filter unit which allows only infrared rays in a wavelength output by the infrared ray emitter to pass through at the entrance of the second hole, in which the infrared ray sensor is disposed.

18. The apparatus of claim 15, wherein an infrared ray absorption material is coated or an infrared ray film is attached on at least the remaining section, on which the light reflection means is not attached, of the numeral wheel, on which the light reflection means is attached.

19. The apparatus of claim 15, wherein the first hole and the second hole of the light sensor unit are formed to be slanted so that the light reflection means becomes a vertex.

20. The apparatus of claim 15, wherein each of the inside walls of the first and second holes is made to be a light reflection film.

21. The apparatus of claim 15, wherein the duty ratio of the driving pulse signal is 1/100 or less.

22. The apparatus of claim 15, wherein the driving pulse signal has a cycle not exceeding 250 ms, a duration time longer than a response time of the infrared ray sensor, and a duty ratio not exceeding 1/100.

* * * * *